(12) United States Patent
Lin et al.

(10) Patent No.: US 8,237,371 B2
(45) Date of Patent: Aug. 7, 2012

(54) DIFFERENTIAL DRIVING CIRCUIT FOR POWERING A LIGHT SOURCE

(75) Inventors: Yung Lin Lin, Palo Alto, CA (US); Ching-Chuan Kuo, Taipei (TW)

(73) Assignee: O2 Micro, Inc, Santa Clara, CA (US)

( * ) Notice: Subject to any disclaimer, the term of this patent is extended or adjusted under 35 U.S.C. 154(b) by 50 days.

(21) Appl. No.: 12/915,807

(22) Filed: Oct. 29, 2010

(65) Prior Publication Data

US 2011/0140619 A1    Jun. 16, 2011

(51) Int. Cl.
*H05B 41/16* (2006.01)

(52) U.S. Cl. .............. 315/247; 315/185 S; 315/291; 315/224; 315/209 R

(58) Field of Classification Search ........... 315/291, 315/224, 225, 247, 246, 185 S, 307–311, 315/312–326
See application file for complete search history.

(56) References Cited

U.S. PATENT DOCUMENTS

| 2002/0071670 A1* | 6/2002 | Odaka et al. ............... 396/206 |
| 2004/0201407 A1* | 10/2004 | Lee et al. .................... 327/172 |
| 2005/0093526 A1 | 5/2005 | Notman |

FOREIGN PATENT DOCUMENTS

EP    1791399 A1    5/2007

\* cited by examiner

*Primary Examiner* — Tuyet Thi Vo

(57) ABSTRACT

A differential driving circuit for powering a light source is disclosed. The differential driving circuit includes a first set of switches and a second set of switches. A first current from a power source flows through the first set of switches to charge a first energy storage element when the first set of switches are turned on. A second current from the first energy storage element flows through the second set of switches to power the light source when the second set of switches are turned on. The differential driving circuit further includes a second energy storage element coupled to the light source in parallel and for providing a differential voltage to the light source.

17 Claims, 7 Drawing Sheets

DIFFERENTIAL DRIVING CIRCUIT FOR POWERING A LIGHT SOURCE

BACKGROUND

Light-emitting diodes (LEDs) can be used as backlight for various applications such as notebooks (NBs), liquid crystal display monitors (LCDMs), and liquid crystal display televisions (LCDTVs). For example, multiple LED strings including hundreds of LEDs are used in a large-size LCDTV. The LED strings are powered by a driving circuit. In order to reduce the cost of the driving circuit, the LEDs can be arrayed in LED strings coupled in parallel. As such, to have less LED strings coupled in parallel, each LED string has more LEDs coupled in series. Therefore, a voltage across the LED string can be relatively high. The relatively high voltage produces a big stress on some circuitry components in the driving circuit and the cost of the driving circuit increases due to the high voltage rating.

FIG. 1 illustrates a conventional driving circuit 100. In the example of FIG. 1, a light source driven by the driving circuit 100 includes an LED string 110 having multiple LEDs coupled in series. A boost converter 120 includes a capacitor 121, a diode 122, a switch 123, e.g., a power metal oxide semiconductor field effect transistor (MOSFET), and an inductor 124. The boost converter 120 converts an input voltage $V_{IN}$, e.g., 24 volts, to an output voltage $V_{OB}$, e.g., 400 volts, across the capacitor 121. A buck converter 130 is coupled between the boost converter 120 and the LED string 110. The buck converter 130 includes a capacitor 131, a diode 132, a switch 133, e.g., a power MOSFET, and an inductor 134. The buck converter 130 converts the output voltage $V_{OB}$, e.g., 400 volts, of the boost converter 120 to a desired voltage $V_{LED}$, e.g., 200 volts, across the LED string 110 to power the LED string 110. Therefore, the voltage across the capacitor 121, the voltage across the diode 122 and the power MOSFET 123, and the voltage across the diode 132 and the power MOSFET 133 are relatively high. Consequently, the high voltage produces a big stress on the diodes 122 and 132 and the power MOSFETs 123 and 133. Thus, the cost of the power MOSFETs 123 and 133 is relatively high due to the high voltage rating. Additionally, the boost-buck topology increases the complexity of the driving circuit 100.

SUMMARY

An embodiment of a differential driving circuit for powering a light source is disclosed. The differential driving circuit includes a first set of switches and a second set of switches. A first current from a power source flows through the first set of switches to charge a first energy storage element when the first set of switches are turned on. A second current from the first energy storage element flows through the second set of switches to power the light source when the second set of switches are turned on. The differential driving circuit further includes a second energy storage element coupled to the light source in parallel and for providing a differential voltage to the light source.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, a differential driving circuit for powering a light source is disclosed. The differential driving circuit includes a first set of switches and a second set of switches. A first current from a power source flows through the first set of switches to charge a first energy storage element when the first set of switches are turned on. A second current from the first energy storage element flows through the second set of switches to power the light source when the second set of switches are turned on. The differential driving circuit includes a second energy storage element coupled to the light source in parallel and for providing a differential voltage to the light source. Compared to the conventional driving circuit, the voltage stress on circuitry components (e.g., the switches) in the differential driving circuit is reduced. Advantageously, the cost of the differential driving circuit of the present invention is reduced due to the lower voltage rating.

Figure 2:
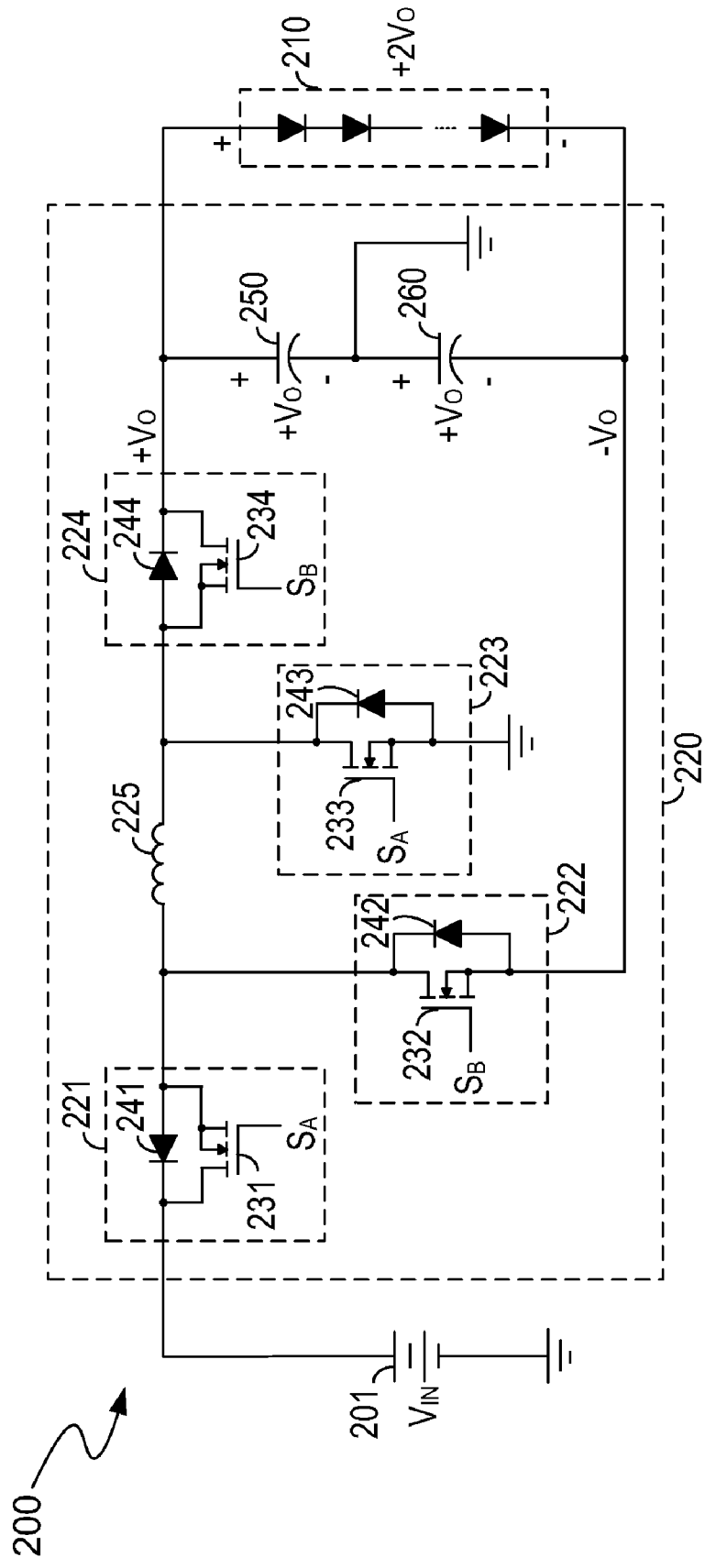
FIG. 2 illustrates a differential driving circuit, in accordance with one embodiment of the present invention.

FIG. 2 illustrates a differential driving circuit 200, in accordance with one embodiment of the present invention. The differential driving circuit 200 includes a converter 220 to convert an input voltage $V_{IN}$ from a power source 201 to an output voltage $V_{OUT}$ to power a load, e.g., a light source. In the example of FIG. 2, the light source includes a light-emitting diode (LED) string 210. Other types of light sources or loads can also be powered by the differential driving circuit 200. The LED string 210 can include multiple LEDs coupled in series. By way of example, the converter 220 can be an alternating current to direct current (AC/DC) boost converter, an AC/DC buck converter, a DC/DC boost converter, or a DC/DC buck converter depending on the input voltage $V_{IN}$ from the power source 201 and the desired voltage for driving the LED string 210.

The converter 220 includes multiple switches, e.g., 221-224. The switch 221 is coupled between the power source 201 and a first terminal of an energy storage element, e.g., an inductor 225. The switch 222 is coupled between the first terminal of the inductor 225 and a negative terminal of the LED string 210. The switch 223 is coupled between a second terminal of the inductor 225 and a reference, e.g., ground. The switch 224 is coupled between the second terminal of the inductor 225 and a positive terminal of the LED string 210.

In one embodiment, the switches 221-224 include power metal oxide semiconductor field effect transistors (MOSFETs) 231-234 respectively. The power MOSFETs 231-234 can be N-channel MOSFETs (NMOSFETs). Body diodes 241-244 are coupled to the power MOSFETs 231-234 respectively. More specifically, in the example of FIG. 2, cathodes of the body diodes 241-244 are coupled to drain terminals of the power MOSFETs 231-234 respectively, and anodes of the body diodes 241-244 are coupled to source terminals of the power MOSFETs 231-234 respectively. Conductance statuses of the power MOSFETs 231 and 233 are controlled by a driving signal $S_A$, and conductance statuses of the power MOSFETs 232 and 234 are controlled by a driving signal $S_B$. By adjusting the duty cycles of the driving signals $S_A$ and $S_B$, the conductance statuses, e.g., the ON/OFF time periods of the power MOSFETs 231-234 are adjusted to obtain a desired voltage $V_{LED}$ across the LED string 210 to drive the LED string 210.

The converter 220 further includes an energy storage element, e.g., a capacitor 250 and a capacitor 260 coupled in series. In the example of FIG. 2, a positive terminal of the capacitor 250 is coupled to the positive terminal of the LED string 210 and a negative terminal of the capacitor 250 is coupled to a reference, e.g., ground. A positive terminal of the capacitor 260 is coupled to the reference, e.g., ground, and a negative terminal of the capacitor 260 is coupled to the negative terminal of the LED string 210. The capacitors 250 and 260 smooth the output voltage $V_{OUT}$ of the converter 220 and reduce the ripple current. In one embodiment, the capacitance of the capacitor 250 is equal to that of the capacitor 260. Therefore, the voltage across the capacitor 250 is equal to the voltage across the capacitor 260. Thus, the capacitors 250 and 260 provide a differential voltage to the LED string 210. In other words, assuming that the voltage across the capacitor 250 is $V_O$, the positive terminal of the LED string 210 receives a voltage Vo while the negative terminal of the LED string 210 receives a voltage −Vo, in the example of FIG. 2.

Figure 3:
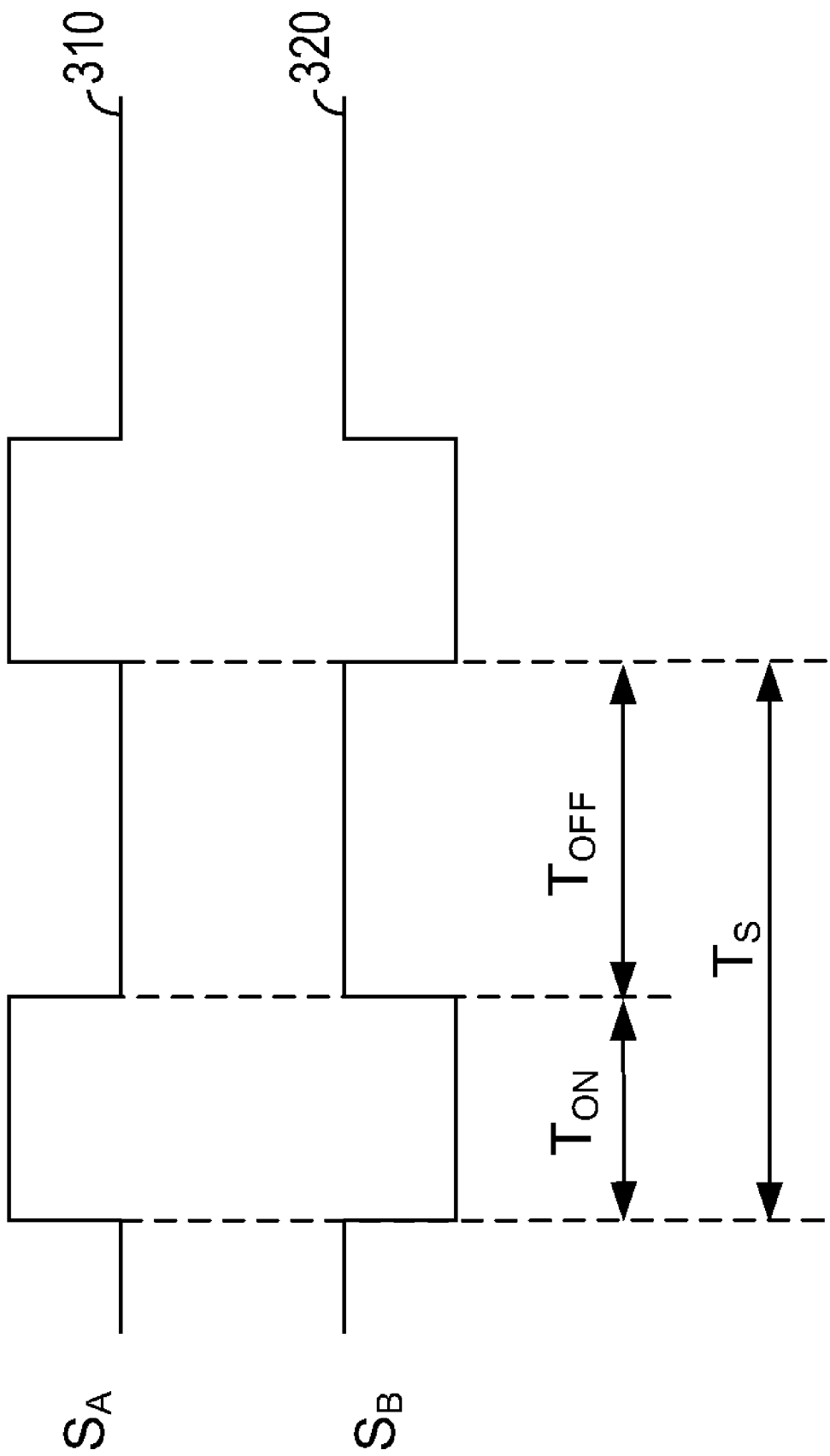
FIG. 3 illustrates an example of a time sequence diagram of driving signals in a differential driving circuit in FIG. 2, in accordance with one embodiment of the present invention.

FIG. 3 illustrates an example of a time sequence diagram of the driving signals $S_A$ and $S_B$ in the differential driving circuit 200 in FIG. 2, in accordance with one embodiment of the present invention. Waveform 310 illustrates a time sequence diagram of the driving signal $S_A$. Waveform 320 illustrates a time sequence diagram of the driving signal $S_B$.

In one embodiment, the driving signals $S_A$ and $S_B$ are periodical signals to turn the power MOSFETs 231 and 233 and the power MOSFETs 232 and 234 on alternately. In the example of FIG. 3, the driving signals are $S_A$ and $S_B$ complementary. During the time period $T_{ON}$, the driving signal $S_A$ is logic high and the driving signal $S_B$ is logic low. The power MOSFETs 231 and 233 are tuned on and the power MOSFETs 232 and 234 are turned off. During the time period $T_{OFF}$, the driving signal $S_A$ is logic low and the driving signal $S_B$ is logic high. The power MOSFETs 231 and 233 are turned off and the power MOSFETs 232 and 234 are turned on.

Figure 4:
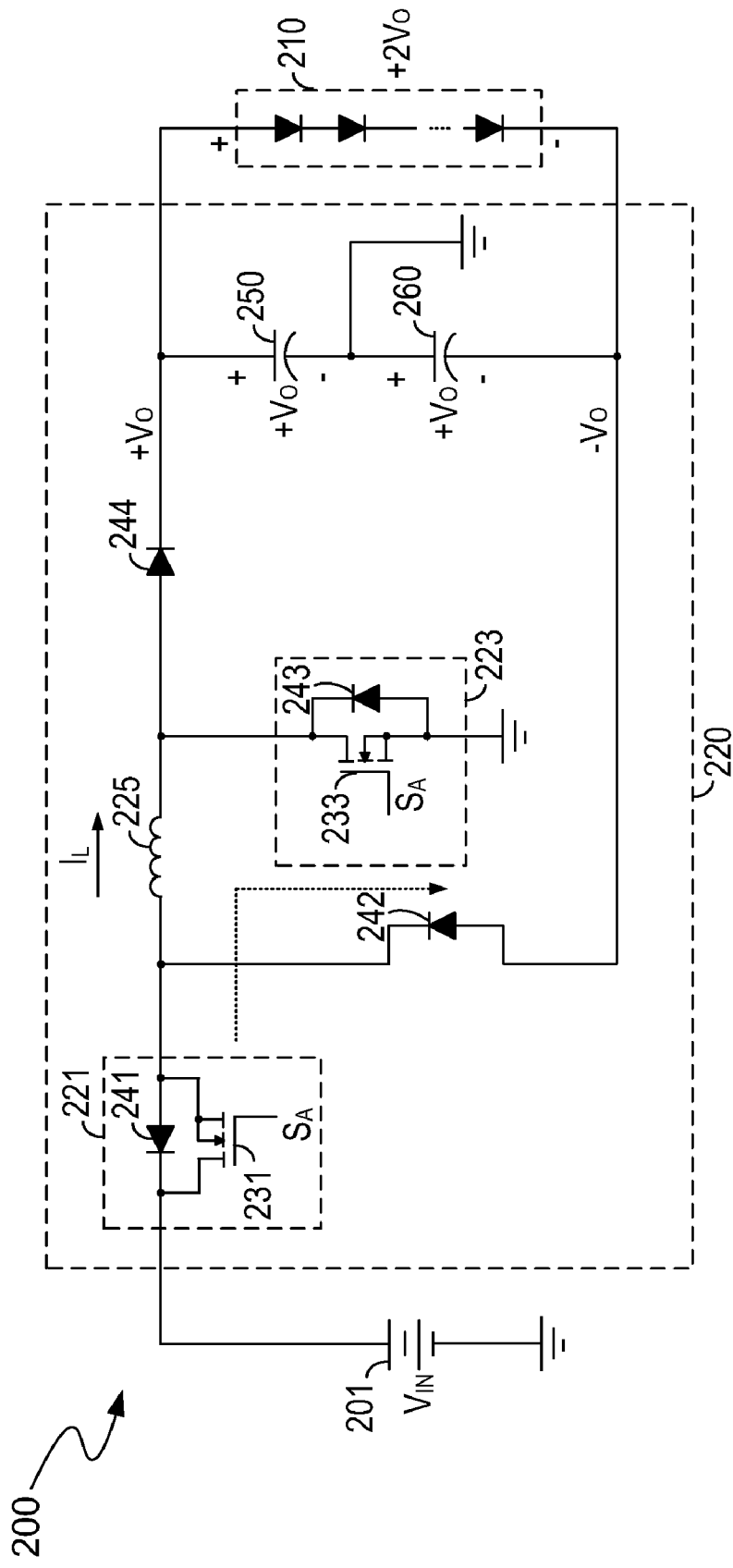
FIG. 4 illustrates an operation of a differential driving circuit in FIG. 2 during a time period $T_{ON}$, in accordance with one embodiment of the present invention.

FIG. 4 illustrates the operation of the differential driving circuit 200 during the time period $T_{ON}$, in accordance with one embodiment of the present invention. As described in relation to FIG. 3, during the time period $T_{ON}$, the power MOSFETs 231 and 233 are tuned on and the power MOSFETs 232 and 234 are turned off. The body diodes 242 and 244 coupled to the power MOSFETs 232 and 234 respectively are reverse-biased and thus are cut off. Hence, during the time period $T_{ON}$, a current $I_L$ from the power source 201 flows through the power MOSFET 231 and the power MOSFET 233 to charge the inductor 225.

Figure 5:
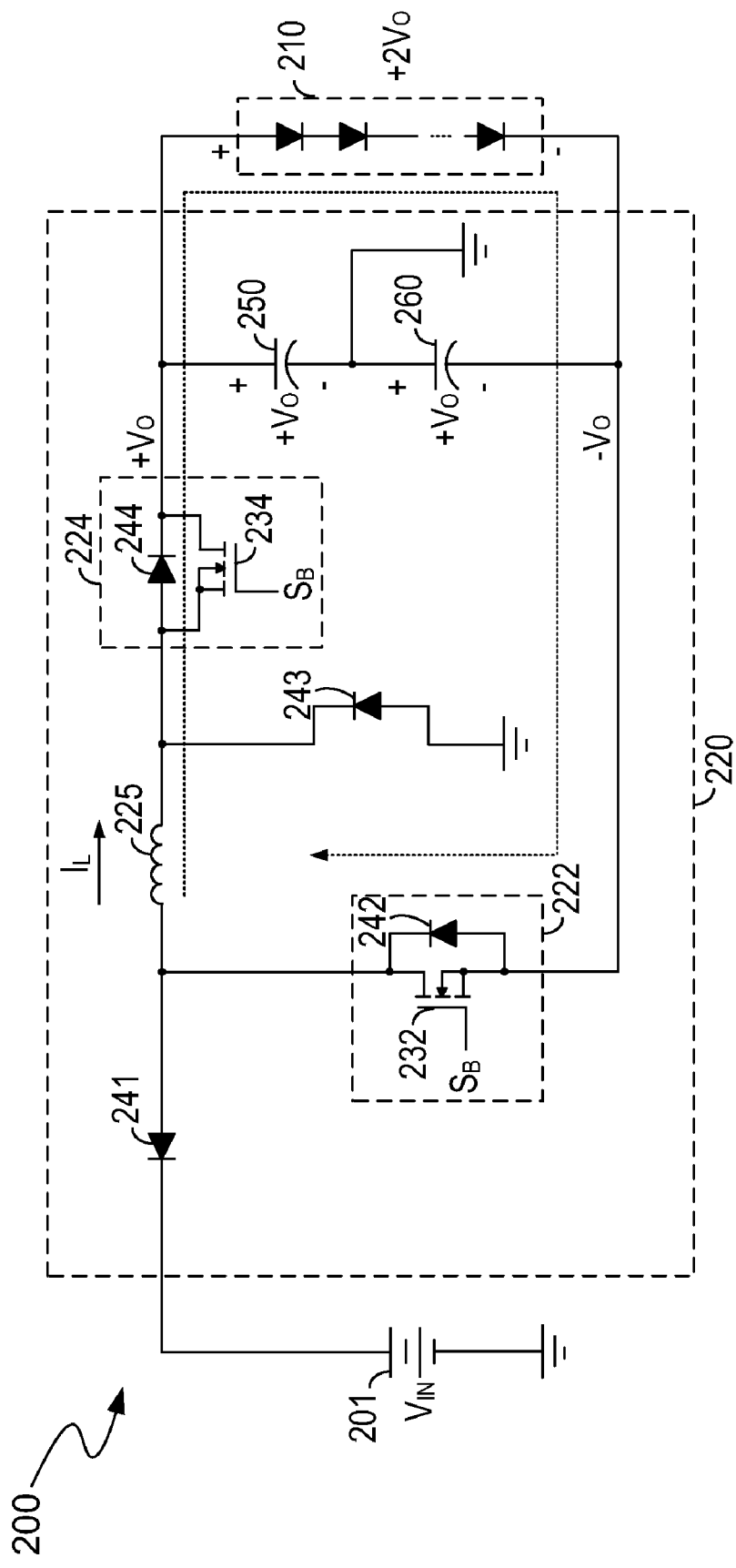
FIG. 5 illustrates an operation of a differential driving circuit in FIG. 2 during a time period $T_{OFF}$, in accordance with one embodiment of the present invention.

FIG. 5 illustrates the operation of the differential driving circuit 200 during the time period $T_{OFF}$, in accordance with one embodiment of the present invention. As described in relation to FIG. 3, during the time period $T_{OFF}$, the power MOSFETs 231 and 233 are turned off and the power MOSFETs 232 and 234 are turned on. The body diodes 241 and 243 coupled to the power MOSFETs 231 and 233 respectively are reverse-biased and thus are cut off. Therefore, a current $I_L$ from the inductor 225 flows through the power MOSFET 234 and the power MOSFET 232 to power the LED string 210.

Figure 6:
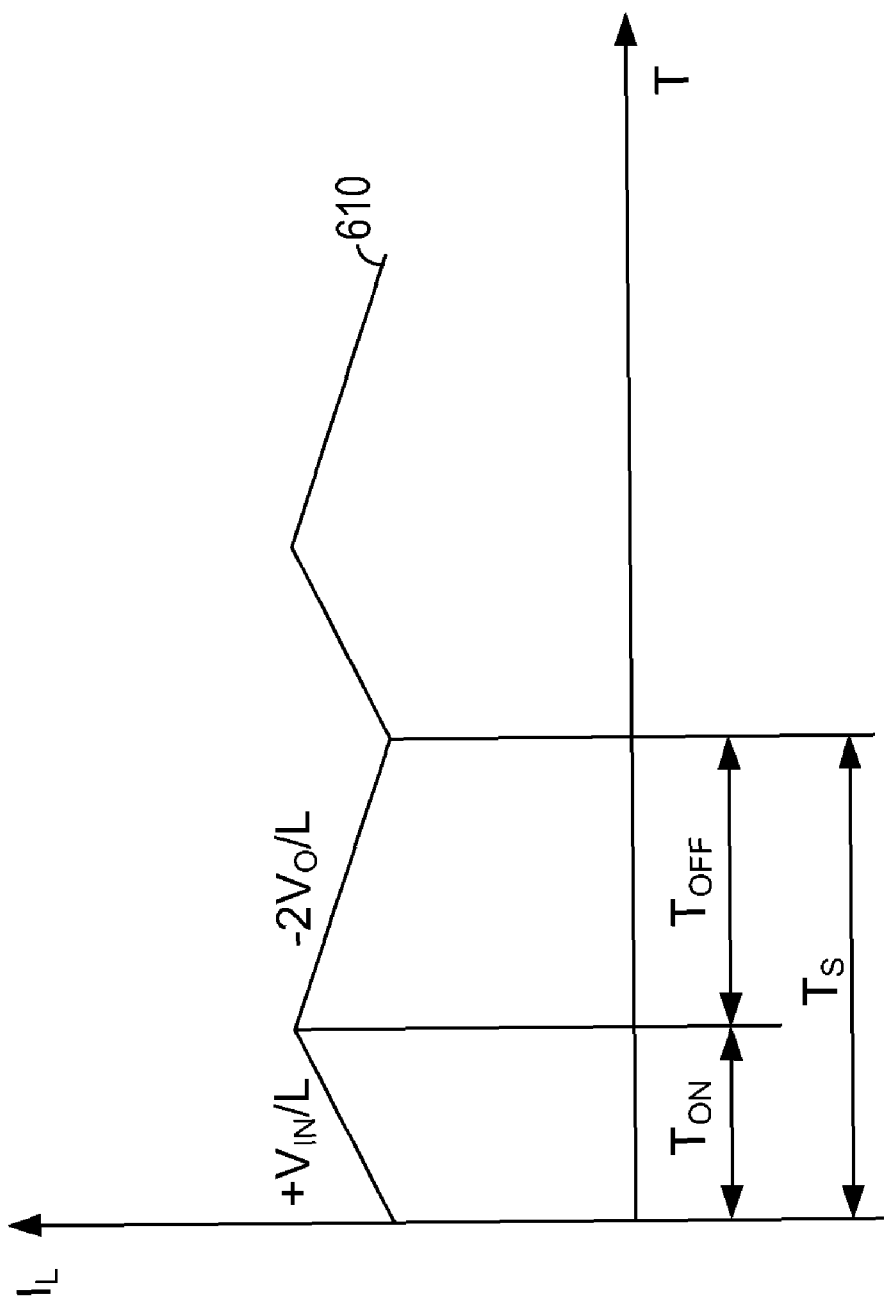
FIG. 6 illustrates a waveform of a current $I_L$ of a differential driving circuit in FIG. 2, in accordance with one embodiment of the present invention.

FIG. 6 illustrates a waveform of the current $I_L$ of the differential driving circuit 200 in FIG. 2, in accordance with one embodiment of the present invention. Waveform 610 represents the current $I_L$ through the inductor 225. In the example of FIG. 6, variation of the current $I_L$ during the time period $T_{ON}$ is the same as that of the current $I_L$ during the time period $T_{OFF}$, which is shown in equation (1):

$$(V_{IN}/L)*T_{ON}=(2V_O/L)*T_{OFF}=(2V_O/L)*(T_S-T_{ON}). \quad (1)$$

$V_{IN}$ is the input voltage from the power source 201. L is the inductance of the inductor 225. $T_{ON}$ is the ON time period during which the power MOSFETs 231 and 233 are turned on. $T_{OFF}$ is the OFF time period during which the power MOSFETs 232 and 234 are turned on. $T_S$ is a cycle period of the driving signals $S_A$ and $S_B$. $2V_O$ is the output voltage $V_{OUT}$ of the converter 220.

$T_{ON}$ is further calculated by equation (2):

$$T_{ON}=D*T_S \quad (2)$$

D is the duty cycle of the driving signal $S_A$.

Combining equation (1) and equation (2), the value of $V_O$ is obtained by equation (3):

$$V_O=(V_{IN}/2)*D/(1-D). \quad (3)$$

Therefore, the output voltage $V_{OUT}$ of the converter 220 that is used to drive the LED string 210 is calculated by equation (4):

$$V_{OUT}=2V_O=V_{IN}*D/(1-D). \quad (4)$$

Figure 1:
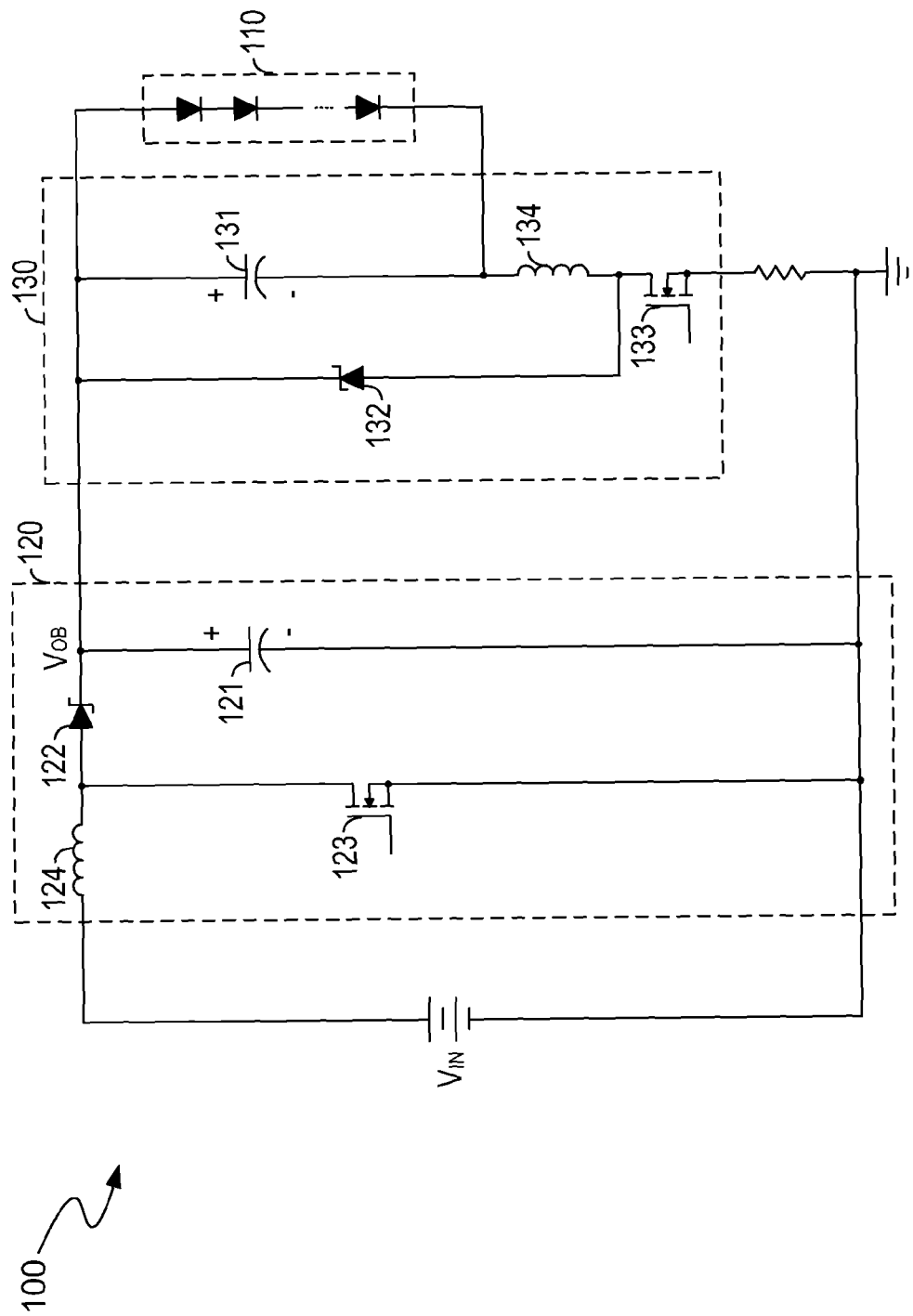
FIG. 1 illustrates a conventional driving circuit.

By way of example, assume that the input voltage $V_{IN}$ is equal to 24 volts and the output voltage $V_{OUT}$ of the converter 220 is 200 volts. Therefore, according to equation (3), the duty cycle of the driving signal $S_A$ is around 0.9. The voltage stress on the power MOSFETs 231 and 232 is equal to $V_{IN}$+$V_O$, e.g., 124 volts. The voltage across the power MOSFETs 233 and 234 is equal to $V_O$, e.g., 100 volts. Compared to the conventional driving circuit 100 in FIG. 1, the voltage stress on the power MOSFETs 231-234 in the differential driving circuit 200 is less. Advantageously, the cost of the power MOSFETs 231-234 is reduced due to the lower voltage rating.

Figure 7:
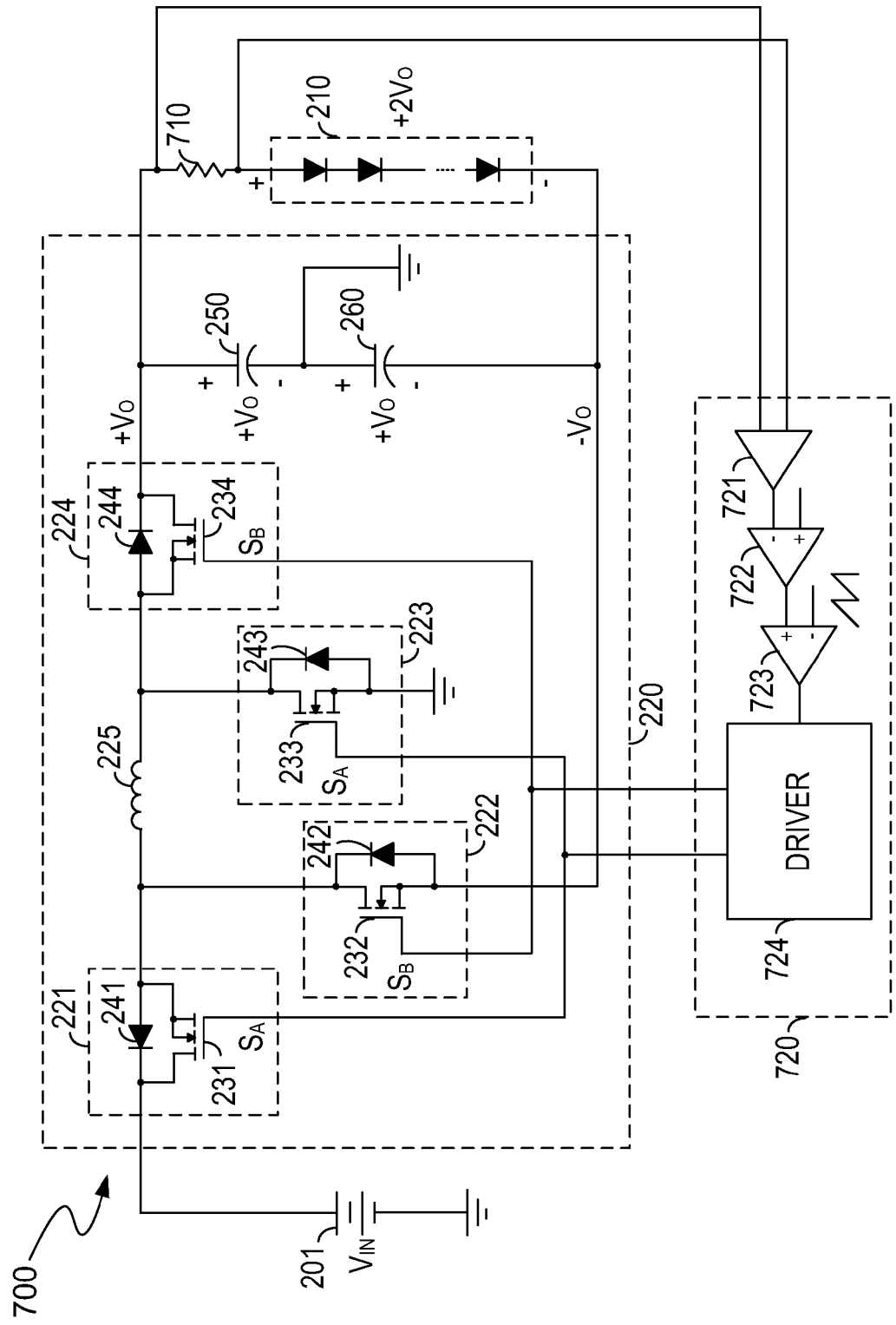
FIG. 7 illustrates a differential driving system, in accordance with one embodiment of the present invention.

FIG. 7 illustrates a differential driving system 700, in accordance with one embodiment of the present invention. Elements labeled same with those in FIG. 2 have similar functions. FIG. 7 is described in combination with FIG. 2-FIG. 6.

In the example of FIG. 7, a sensor, e.g., a sense resistor 710 is serially coupled to the LED string 210 which is driven by the output voltage $V_{OUT}$ of the converter 220. The sense resistor 710 senses a current flowing through the LED string 210 and provides a voltage indicating the current through the LED string 210.

The differential driving system 700 further includes a controller 720 coupled to the sense resistor 710 for receiving a sense signal indicating the current through the LED string 210 and to generate the driving signals $S_A$ and $S_B$ according to the sense signal to regulate power to the LED string 210. For example, when the input voltage $V_{IN}$ varies, the output voltage $V_{OUT}$ of the converter 220 varies. As a result, the current through the LED string 210 varies. The controller 720 senses the current through the LED string 210 and adjusts the duty cycles of the driving signals $S_A$ and $S_B$ to regulate the ON/OFF time periods of the power MOSFETs 231-234 until the current through the LED string 210 reaches a desired level.

For example, when the current through the LED string 210 increases, e.g., when the input voltage $V_{IN}$ increases, the controller 720 decreases the duty cycle of the driving signal $S_A$ to decrease the ON time periods of the power MOSFETs 231 and 233. At the same time, the duty cycle of the driving signal $S_B$ is increased and the ON time periods of the power MOSFETs 232 and 234 are increased. When the current through the LED string 210 decreases, e.g., when the input voltage $V_{IN}$ decreases, the controller 720 increases the duty cycle of the driving signal $S_A$ to increase the ON time periods of the power MOSFETs 231 and 233. At the same time, the duty cycle of the driving signal $S_B$ is decreased and the ON time periods of the power MOSFETs 232 and 234 are decreased. Thus, by adjusting the duty cycles of the driving signals $S_A$ and $S_B$, the current through the LED string 210 is adjusted to a desired level.

More specifically, the controller 720 includes a current sensing amplifier 721, an error amplifier 722, a comparator 723, and a driver 724, in one embodiment. The current sensing amplifier 721 receives the voltage across the sense resistor 710 indicative of the current through the LED string 210. The current sensing amplifier 721 converts the voltage across the sense resistor 710 to an amplified output signal. The error amplifier 722 receives the amplified output signal from the current sensing amplifier 721. The error amplifier 722 compares the amplified output signal indicating the current through the LED string 210 with a reference signal, and generates an error signal based upon the comparison result. In one embodiment, the comparator 723 is coupled to the error amplifier 722 and compares the error signal with a sawtooth signal. The driver 724 is coupled to the comparator 723 and adjusts the duty cycles of the driving signals $S_A$ and $S_B$ based upon the comparison result of the error signal and the sawtooth signal. The conductance statuses of the power switches 231-234 are adjusted under the control of the driving signals $S_A$ and $S_B$. Accordingly, the current through the LED string 210 is adjusted to a desired level.

Accordingly, embodiments in accordance with the present invention provide a differential driving circuit for powering a light source. The differential driving circuit includes a first energy storage element, a first set of switches, and a second set of switches. The first set of switches includes a first switch and a second switch. The first switch is coupled between the power source and a first terminal of the first energy storage element. The second switch is coupled between a second terminal of the first energy storage element and a reference, e.g., ground. The second set of switches includes a third switch and a fourth switch. The third switch is coupled between the first terminal of the first energy storage element and a first terminal of the light source. The fourth switch is coupled between the second terminal of the first energy storage element and a second terminal of the light source. A driving signal $S_A$ controls conductance statuses of the first set of switches. A driving signal $S_B$ controls conductance statuses of the second set of switches. In one embodiment, the first set of switches and the second set of switches are turned on alternately. By adjusting duty cycles of the driving signals $S_A$ and $S_B$, the conductance statuses of the first set of switches and the second set of switches are adjusted to obtain a desired voltage $V_{LED}$ to power the light source.

The differential driving circuit further includes a second energy storage element coupled to the light source in parallel. In one embodiment, the second energy storage element includes a first capacitor and a second capacitor in series. A positive terminal of the first capacitor is coupled to the second terminal of the light source. A negative terminal of the first capacitor and a positive terminal of the second capacitor are coupled to a reference, e.g., ground. A negative terminal of the second capacitor is coupled to the first terminal of the light source. In one embodiment, the first capacitor has the same capacitance as the second capacitor. Therefore, the voltage across the first capacitor is equal to that across the second capacitor. Thus, the light source is driven by a differential voltage, e.g., one terminal of the light source receives a voltage $+V_O$, while the other terminal of the light source receives a voltage $-V_O$. Consequently, the voltage stress on the first switch and the third switch is equal to $V_{IN}+V_O$. The voltage stress on the second switch and the fourth switch is equal to $V_O$.

Advantageously, due to the differential driving topology used for powering the light source, the voltage stress on the circuitry components, e.g., the first switch, the second switch, the third switch, and the fourth switch is reduced. Compared to the conventional boost-buck structure, the first switch, the second switch, the third switch, and the fourth switch in the differential driving circuit are more cost-effective due to the lower voltage rating.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A differential driving circuit for powering a light emitting diode (LED) light source, said differential driving circuit comprising:
   a first plurality of switches, wherein a first current from a power source flows through said first plurality of switches to charge a first energy storage element when said first plurality of switches are turned on;
   a second plurality of switches, wherein a second current from said first energy storage element flows through said second plurality of switches to power said LED light source when said second plurality of switches are turned on; and a second energy storage element coupled to said LED light source in parallel and for providing a differential voltage to said LED light source.

2. The differential driving circuit of claim 1, wherein said first plurality of switches and said second plurality of switches are turned on alternately.

3. The differential driving circuit of claim 1, wherein said first plurality of switches comprises a first switch and a second switch, wherein said first switch is coupled between said power source and a first terminal of said first energy storage element, and wherein said second switch is coupled between a second terminal of said first energy storage element and a reference.

4. The differential driving circuit of claim 1, wherein said second plurality of switches comprises a first switch and a second switch, wherein said first switch is coupled between a first terminal of said first energy storage element and a first terminal of said LED light source, and wherein said second switch is coupled between a second terminal of said first energy storage element and a second terminal of said LED light source.

5. The differential driving circuit of claim 1, wherein said second energy storage element comprises a first capacitor and a second capacitor in series.

6. The differential driving circuit of claim 5, wherein a positive terminal of said first capacitor is coupled to a first terminal of said LED light source, wherein a negative terminal of said first capacitor and a positive terminal of said second capacitor are coupled to a reference, and wherein a negative terminal of said second capacitor is coupled to a second terminal of said LED light source.

7. A driving system for powering a light emitting diode (LED) light source, said driving system comprising:
a first switch coupled between a power source and a first terminal of a first energy storage element;
a second switch coupled between a second terminal of said first energy storage element and a reference;
a third switch coupled between said first terminal of said first energy storage element and a first terminal of said LED light source; and
a fourth switch coupled between said second terminal of said first energy storage element and a second terminal of said LED light source,
wherein conductance statuses of said first switch, said second switch, said third switch, and said fourth switch are controlled to regulate power to said LED light source, wherein conductance statuses of said first switch and said second switch are controlled by a first signal, and wherein conductance statuses of said third switch and said fourth switch are controlled by a second signal.

8. The driving system of claim 7, wherein said first signal and said second signal are complimentary.

9. The driving system of claim 7, wherein a first plurality of switches and a second plurality of switches are turned on alternately, wherein said first plurality of switches comprise said first and second switches, and wherein said second plurality of switches comprise said third and fourth switches.

10. The driving system of claim 7, further comprising:
a sensor coupled to said LED light source in series and for sensing a current flowing through said LED light source.

11. The driving system of claim 7, further comprising:
a controller for receiving a sense signal indicating a current flowing through said LED light source and for generating said first and second signals according to said sense signal to regulate power to said LED light source.

12. The driving system of claim 7, further comprising:
an error amplifier for comparing a sense signal indicating a current flowing through said LED light source with a reference signal and for generating an error signal; and
a comparator coupled to said error amplifier and for comparing said error signal with a sawtooth signal.

13. The driving system of claim 12, further comprising:
a driver coupled to said comparator and for generating said first signal and said second signal, and for adjusting duty cycles of said first signal and said second signal based upon a comparison result of said error signal and said sawtooth signal.

14. The driving system of claim 7, wherein a first current from said power source flows through said first switch and said second switch to charge said first energy storage element when said first signal is in a first state.

15. The driving system of claim 14, wherein a second current from said first energy storage element flows through said fourth switch and said third switch to power said LED light source when said first signal is in a second state.

16. The driving system of claim 7, further comprising:
a second energy storage element coupled to said LED light source in parallel and for providing a differential voltage to said LED light source.

17. The driving system of claim 16, wherein said second energy storage element comprises a first capacitor and a second capacitor in series, wherein a positive terminal of said first capacitor is coupled to said second terminal of said LED light source, wherein a negative terminal of said first capacitor and a positive terminal of said second capacitor are coupled to said reference, and wherein a negative terminal of said second capacitor is coupled to said first terminal of said LED light source.

\* \* \* \* \*